United States Patent [19]
Hand et al.

[11] Patent Number: 5,711,575
[45] Date of Patent: Jan. 27, 1998

[54] OFFICE CHAIR AND ADJUSTABLE LUMBAR SUPPORT THEREFOR

[75] Inventors: R. Scott Hand, Holland, Mich.; Robert W. Pekar, Florence, Mass.; Jeffrey A. Weber, Minneapolis, Minn.

[73] Assignee: Herman Miller, Inc., Zeeland, Mich.

[21] Appl. No.: 660,760

[22] Filed: Jun. 6, 1996

Related U.S. Application Data

[60] Provisional application No. 60/000,117 Jun. 9, 1995.

[51] Int. Cl.$^6$ ............................................. A47C 7/46
[52] U.S. Cl. .............................. 297/284.6; 297/284.5
[58] Field of Search ......................... 297/284.1, 284.5, 297/284.6, 284.7

[56] References Cited

U.S. PATENT DOCUMENTS

| | | |
|---|---|---|
| D. 295,347 | 4/1988 | Chadwick et al. . |
| 3,279,849 | 10/1966 | Radke et al. ............... 297/284.5 |
| 3,652,126 | 3/1972 | Folling . |
| 3,974,827 | 8/1976 | Bodeen ........................ 297/284.6 |
| 4,506,929 | 3/1985 | Josefek . |
| 4,514,010 | 4/1985 | Sabater Gonzales . |
| 4,516,568 | 5/1985 | Baxter et al. . |
| 4,518,200 | 5/1985 | Armstrong . |
| 4,529,247 | 7/1985 | Stumpf et al. ............ 297/DIG. 2 X |
| 4,555,140 | 11/1985 | Nemoto . |
| 4,615,563 | 10/1986 | Kobayashi . |
| 4,690,456 | 9/1987 | Chiba et al. . |
| 4,707,027 | 11/1987 | Horvath et al. . |
| 4,718,724 | 1/1988 | Quinton et al. . |
| 4,759,543 | 7/1988 | Feldman . |
| 4,789,202 | 12/1988 | Alter . |
| 4,807,931 | 2/1989 | Ishida et al. . |
| 4,957,102 | 9/1990 | Tan et al. . |
| 4,960,304 | 10/1990 | Frantz . |
| 5,022,109 | 6/1991 | Pekar . |
| 5,054,854 | 10/1991 | Pruit . |
| 5,076,643 | 12/1991 | Colasanti et al. ............ 297/284.6 |
| 5,137,329 | 8/1992 | Neale . |
| 5,144,708 | 9/1992 | Pekar . |
| 5,171,209 | 12/1992 | Gamba . |
| 5,190,348 | 3/1993 | Colasanti . |
| 5,280,997 | 1/1994 | Andres et al. . |
| 5,314,235 | 5/1994 | Johnson . |
| 5,351,710 | 10/1994 | Phillips . |
| 5,372,487 | 12/1994 | Pekar . |

FOREIGN PATENT DOCUMENTS

| | | | |
|---|---|---|---|
| A 267348 | 12/1968 | Germany | ............ 297/284.5 |
| A 3334864 A1 | 4/1985 | Germany | ............ 297/284.6 |
| WO 93/25121 | 12/1993 | WIPO . | |

OTHER PUBLICATIONS

English language Derwent Publication for German Patent A 3334864.

*Primary Examiner*—Peter R. Brown
*Attorney, Agent, or Firm*—Brinks Hofer Gilson & Lione

[57] ABSTRACT

An inflatable lumbar support system that includes a plurality of thermoplastic layers sealed together to form at least two laterally spaced bladders. A resiliently flexible face panel is disposed between the back of the user and the inflatable chambers. The panel is composed of form stable outer portions overlying the laterally spaced bladders and a medial portion therebetween of substantially greater yieldability than the outer portions of the panel. The inflatable lumbar support system is incorporated within a chair having a one-piece shell with a backrest that is cantilevered from the top of the backrest. The lumbar support system is carried by a mounting plate that includes a pair of mounting hooks that attach to and can slide vertically along the side edge of the cantilevered portion of the backrest. The lumbar support system can be slid vertically along the cantilevered backrest and can be inflated and deflated by a person setting in the chair.

42 Claims, 8 Drawing Sheets

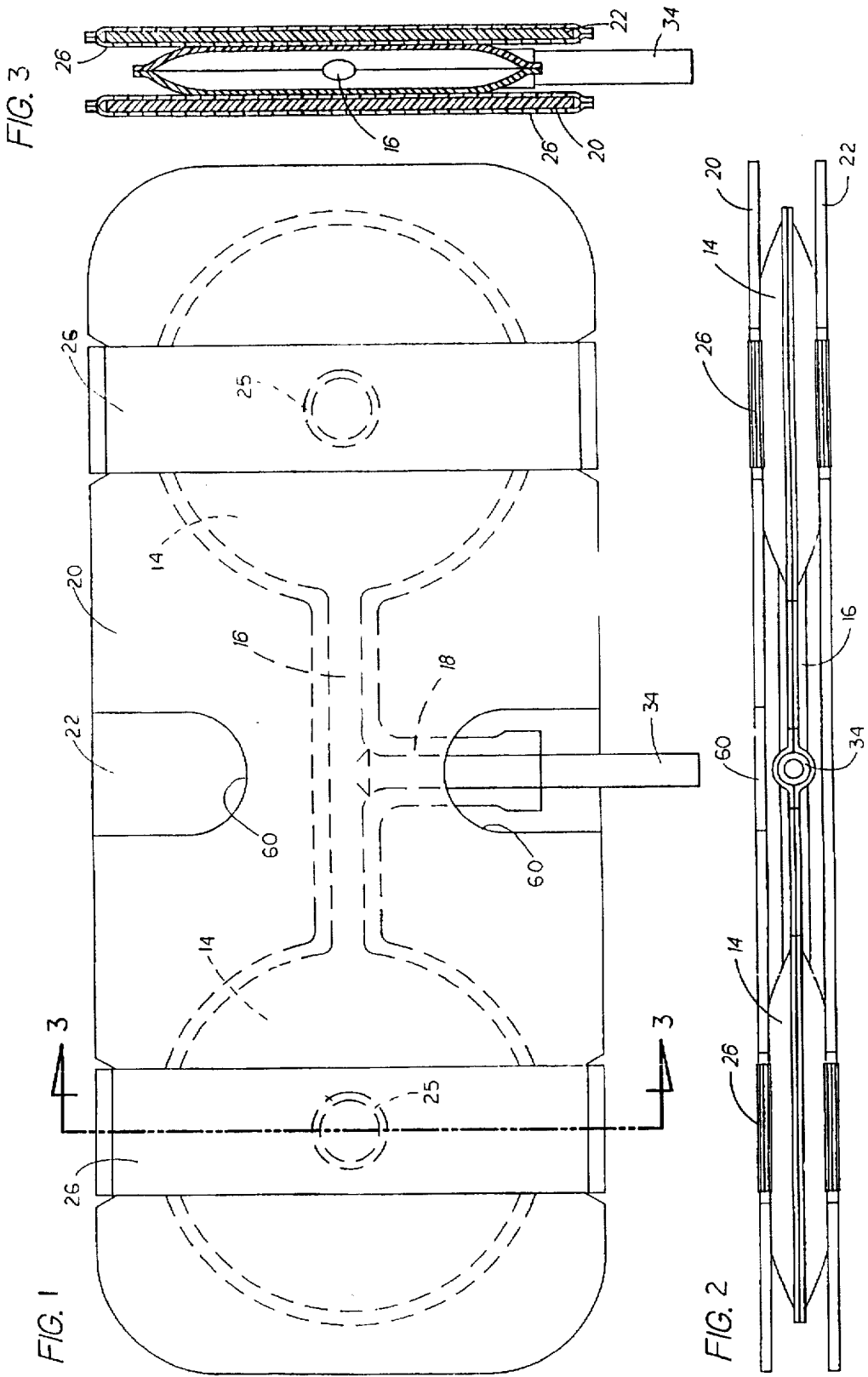

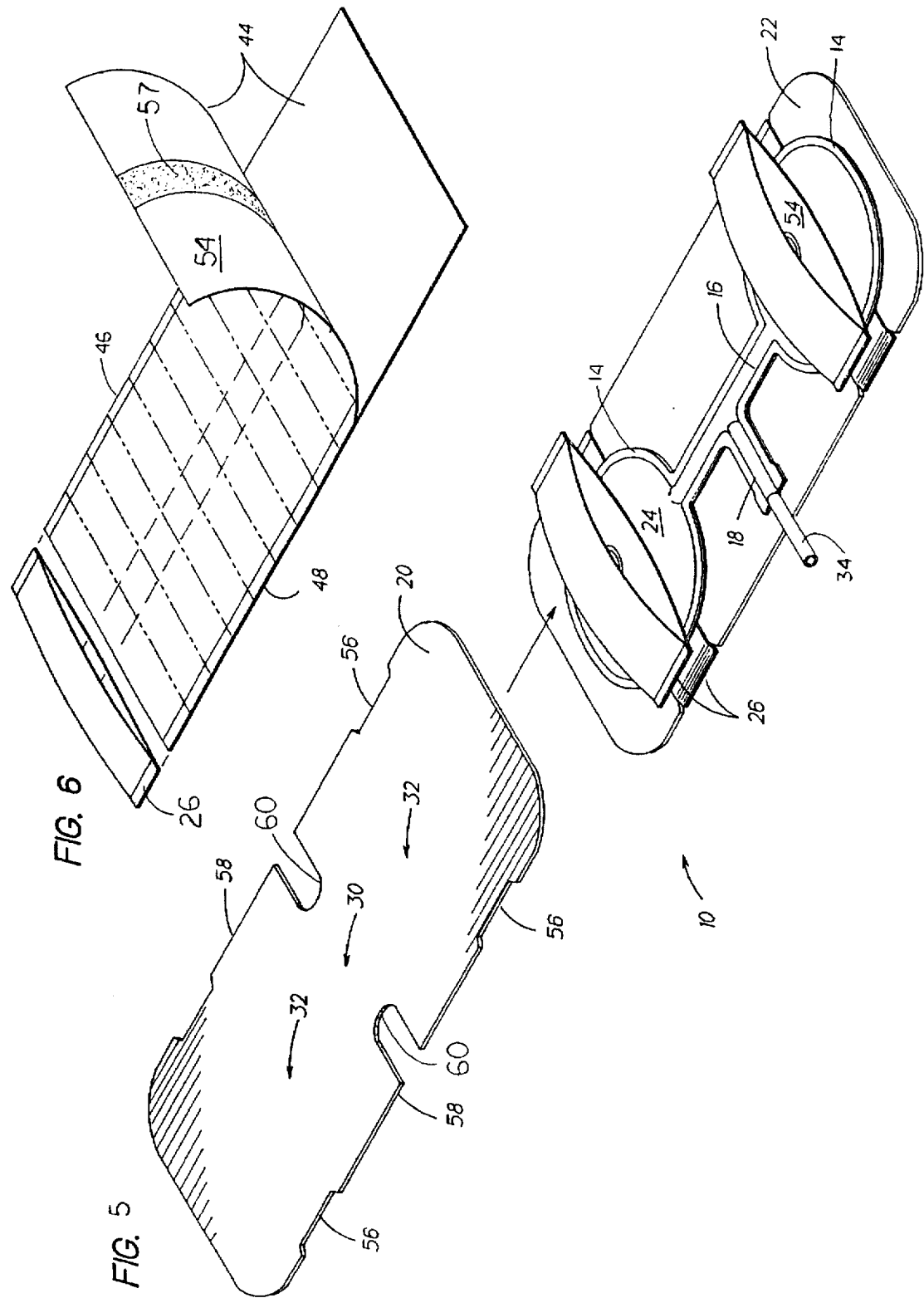

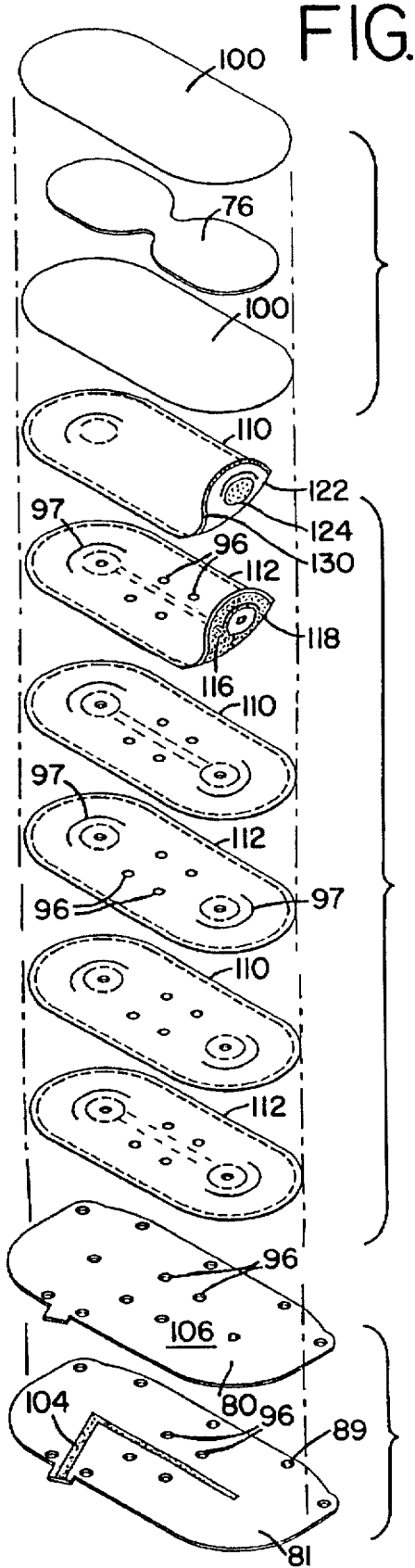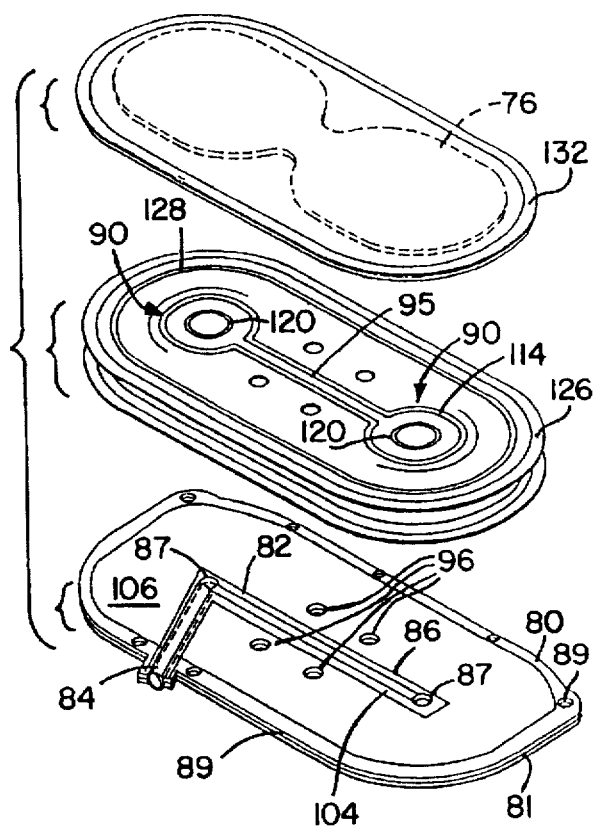

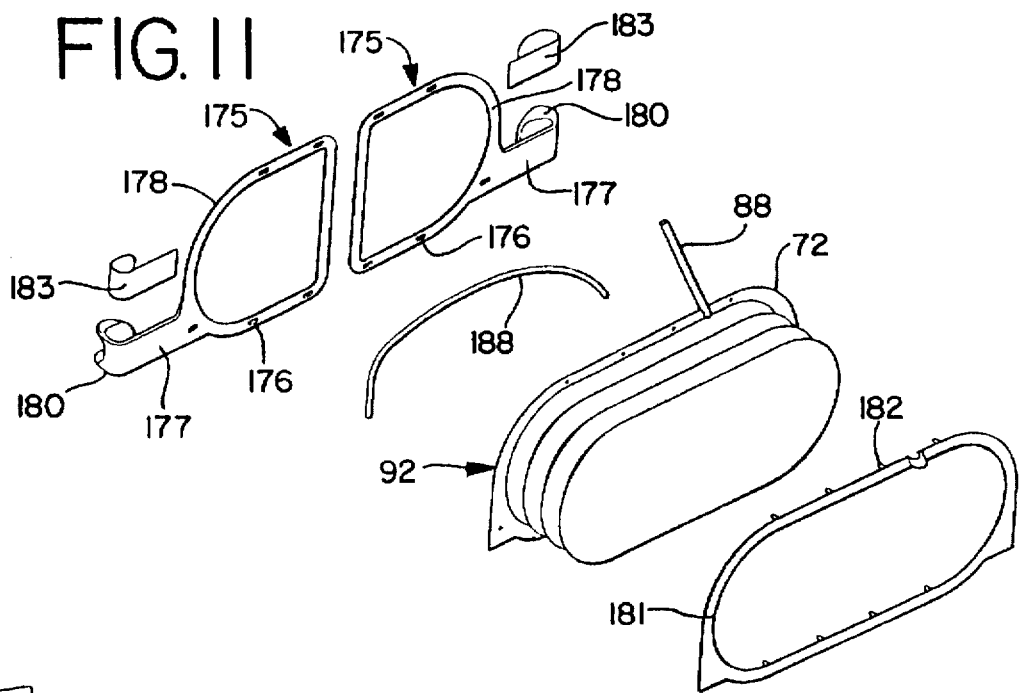
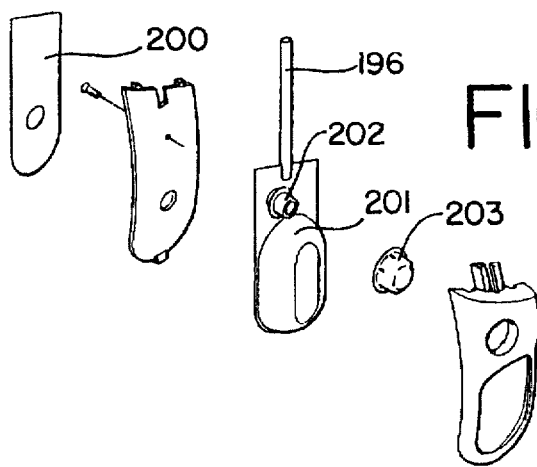
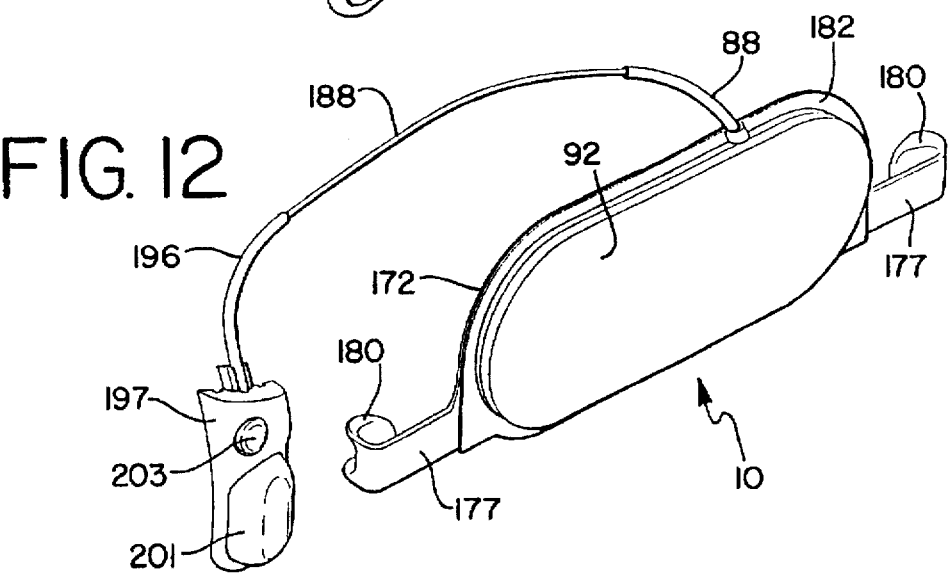

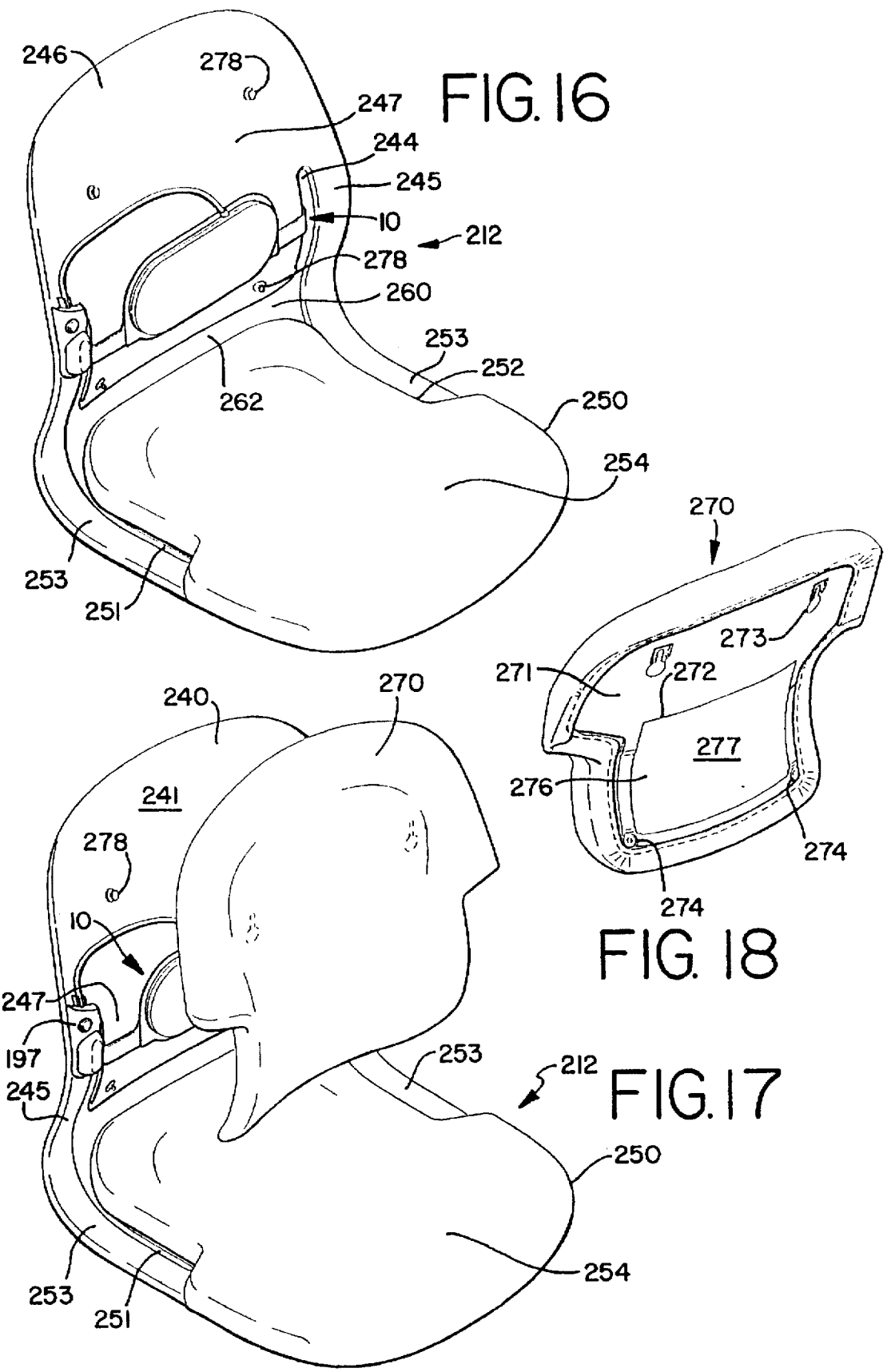

ns
5,711,575

1

OFFICE CHAIR AND ADJUSTABLE LUMBAR SUPPORT THEREFOR

This application is based on Provisional Application 60/000,117 filed Jun. 9, 1995.

FIELD OF THE INVENTION

This invention relates to inflatable body support structures and, more particularly, to lumbar support systems, which are adapted for use with chairs and particularly with office chairs.

BACKGROUND OF THE INVENTION

A chair having a one-piece shell of the type to which this invention can be applied is disclosed in U.S. Pat. No. 4,529,247. The disclosure of U.S. Pat. No. 4,529,257 is hereby included by reference as a part of this disclosure. The one-piece shell of this chair is molded from a high strength resilient plastic material, for example, fiberglass reinforced polyester resin. This chair provides postural support to a wide variety of people of different shapes and sizes through a variety of seated positions. The chair comprises a shell with a backrest and a seat pan integrally formed of structurally resilient material.

A U-shaped slot is formed in the seat pan. The bight portion of the U-shaped slot extends from the back of the seat pan along side portions thereof to define a cantilevered seat support that extends rearwardly from a forward portion of the seat pan. Seat webs extend rearwardly from the forward portion of the seat pan. The shell is mounted on a base in such a way that interference with the flexing of the cantilevered seat support is avoided. The cantilevered seat support reduces the shock of setting down, accommodates different shape users and adapts to the movements of the user in various postural relationships within the chair.

A U-shaped slot is also formed in the backrest of the one-piece shell near the side and lower portions thereof to form a cantilevered back support extending downward from an upper portion of the backrest. Back webs extend downwardly from the upper portion of the backrest adjacent the cantilevered back support. The backrest is of a shape and the shell is formed from material having sufficient rigidity and flexural strength such that the cantilevered back support and upper backrest support resiliently flex as a unit with respect to its integral connection to the seat pan. Thus, the backrest support automatically adjust to different size and shape persons and automatically accommodates different postural positions of the user in the chair.

In the preferred embodiment of the one-piece shell chair the U-shaped slots are joined at their bight portions to together form an H-shaped slot leaving flexure webs on each side of the shell between the seat support and the backrest support. The flexure webs joins with the seat webs and the back webs such that the backrest can resiliently flex with respect to the seat pan independently of the flexing of the cantilevered seat support and seat pan. Although the chair can be used in the shell form it may be covered with a foam cushion and/or fabric.

Although this chair can accommodate a variety of different shaped and sized people as a result of the flexibly suspended seat pan and backrest and can accommodate movements and shifts in the users positions some users become uncomfortable after setting in any chair especially after long periods of time. This is particularly true if the person setting in the chair is restricted in the postural positions that he or she can assume for reasons such as the work task that they are performing. The lumbar vertebrae, located in the small of the back and the surrounding muscles, tendons and ligaments are a common source of discomfort for a great many people after setting for prolonged periods. This source of discomfort can be precipitated by a person setting in a chair for long periods or setting in a chair in the same position for a long period of time.

For the foregoing reasons, there is a need for a one-piece shell chair in which the user of the chair can while seated in the chair change the contour of the backrest in the lumbar region to gain relief and avoid discomfort.

An inflatable support that can be secured to the backrest portion of an automobile seat is disclosed in U.S. Pat. No. 5,171,209. The inflatable support includes a rigid back element that is secured to the seat and to which a non-rigid inflatable element is secured. The non-rigid inflatable element is divided into two chambers that are interconnected by a mutual inflation and deflation tube. The two chambers are separated by a space that will be located in the spinal area of the person setting in the seat. The inflatable portions of the inflatable element are located such that they will engage the lumbar region of the person setting in the seat. An inflation pump, powered by an electric motor, periodically feeds pressurized air to the mutual inflation tube and thug to the two chambers. A deflation aperture is provide that will permit air to escape at a slower rate than it is provided by the inflation device to thus produce a cyclical inflation and deflation of the inflatable chambers. This reference requires a power source to periodically inflate the chambers and thus cause the chambers to pulsate. While, providing electric power in an automobile seat is feasible it is not desirable in for example an office chair. Also the support of this reference is stationary and cannot be adjusted vertically to change the location to which pressure is applied. Furthermore, the surface of the inflatable chambers is flexible and will not apply a uniform pressure over the contact area.

Co-pending application Ser. No. 449,898, filed May 23, 1995 discloses a co-planar multi-laminar mattress cushion and lumbar support system composed of a plurality of discrete chambers sealed to a fluid flow control panel which provides fluid flow conduits for inflation of the chambers. The invention of this application includes the concept of systematically inflating and deflating the discrete chambers so as to provide a constantly changing contour to the mattress cushion and lumbar support.

SUMMARY OF THE INVENTION

This invention consist of a lumbar support system that includes at least two inflatable bladders laterally spaced to provide support to the lumbar region of the user's back and a resiliently flexible panel for spreading the pressure at the user's back.

This invention further consist of a lumbar support system having a resiliently flexible panel for spreading the pressure at the user's back that includes a medial portion having substantially greater flexibility than the outer portions.

It is the principal object of this invention to provide an inflatable lumbar support system which is more economical to produce, easier and more effective to use and which overcomes the drawbacks of the prior art.

It is another object of this invention to provide an inflatable lumbar support system that, prior to inflation thereof, is compact and has a relatively thin co-planar configuration such that it will not be apparent to a person seated in a chair until it is inflated.

It is a further object of this invention to provide an inflatable lumbar support that has a comfortable and supportive surface that conforms to the user's back.

It is yet another object of this invention to provide an inflatable lumbar support system which although more compact than any prior systems is capable of greater expansion for maximum support of the lumbar region of the user's back.

The invention consists of an office chair having a back shell including a cantilevered portion having vertical side edges along which an inflatable bladder assembly can be vertically adjusted.

The bladder assembly of this invention including an inflatable bladder and a pair of mounting devices extending laterally outward therefrom for attachment to the side edge portions of the cantilevered portion of the backrest.

The inflatable bladder of this invention includes an actuator assembly for selectively admitting and venting air under pressure to said bladder.

The backrest of the one-piece shell of this invention includes a cushion covering the back shell that will allow vertical adjustment of the inflatable bladder and will deforms in response to actuation of the bladder to provide an adjustable support for the lumbar region of the back of a user sitting in the chair.

The present invention is directed to a one-piece shell chair that will permit the user of the chair to adjust the contour of the backrest in the lumbar area while setting in the chair. Very slight changes in the angle or degree of extension of the spine can result in significant weight bearing shifts and pressures in the spinal area. Weight bearing and pressure shifts in the lumbar area can result in instant relief from discomfort and pain. Thus, if a person setting in a chair can make very small adjustments to the contour of the chair's backrest, and thus make changes in the weight bearing angle and the pressure being exerted in the lumbar area, discomfort can be relieved. Also, the person setting in a chair can improve their comfort if they can periodically make adjustment to the contour of the chair's backrest. The change required in the chair's contour to provide relief varies with the individual using the chair, and only the person using the chair knows when the discomfort has been relieved. For this reason it is very important that the person using the chair be able to adjust the contour while seated in the chair.

The apparatus that will enable a person setting in a one-piece shell chair to adjust the contour and thereby relief discomfort comprises an inflatable assembly that is vertical slidable along the edge of the cantilevered backrest portion of the backrest.

This apparatus will allow the person using the chair to inflate or deflate the inflatable assembly and shift it up or down the edge of the cantilevered portion of the backrest while seated in the chair.

The inflatable apparatus can be located under a cushion that overlays the cantilevered portion of the backrest and slide along the edges of the cantilevered portion of the backrest.

Further, the present invention is directed to an inflatable lumbar support system that has laterally spaced inflatable bladders. Each of the bladders includes a plurality of vertically stacked inflatable chambers having an inflated vertical dimension substantially greater than its fixed horizontal dimension to provide firm support to the lumbar regions of the back. This invention further includes a resiliently flexible face panel disposed to interface with the back of the user and the inflatable chambers. The panel is composed of form stable outer portions overlying said bladders and a medial portion therebetween of substantially greater yieldability than the outer portions of the panel.

BRIEF DESCRIPTION OF THE DRAWINGS

The drawings show an embodiment of the invention in which:

FIG. 1 is a front plan view of the lumbar support system of FIG. 1.

FIG. 2 is a bottom plan view of the lumbar support system of FIG. 1.

FIG. 3 is a cross-sectional view taken along line 3—3 of the lumbar support system of FIG. 1.

FIG. 5 is a perspective view of a lumbar support system in a partially assembled condition of the type which embodies the present invention.

FIG. 6 is a perspective view of the straps of the lumbar support system of FIG. 1 during a step in the manufacture thereof.

FIG. 9 is an exploded perspective view, illustrative of the method of manufacture of the lumbar support system of FIG. 7.

FIG. 10 is a partially exploded perspective view, illustrative of the method of manufacture of said lumbar support system of FIG. 7.

FIG. 11 is a an exploded view of the inflated inflatable lumbar assembly.

FIG. 12 is an isolated front view of the assembled inflatable lumbar assembly.

FIG. 13 is an exploded view of the pump mechanism.

FIG. 16 is an front perspective view of a one-piece shell with the inflatable lumbar assembly attached thereto.

FIG. 17 is an exploded view of a one-piece shell with the inflatable lumbar assembly attached thereto and an upholstered cushion.

FIG. 18 is a rear view of the inner shell of the upholstered cushion showing the shielding material.

DETAILED DESCRIPTION OF THE PREFERRED EMBODIMENT

Figure 4:
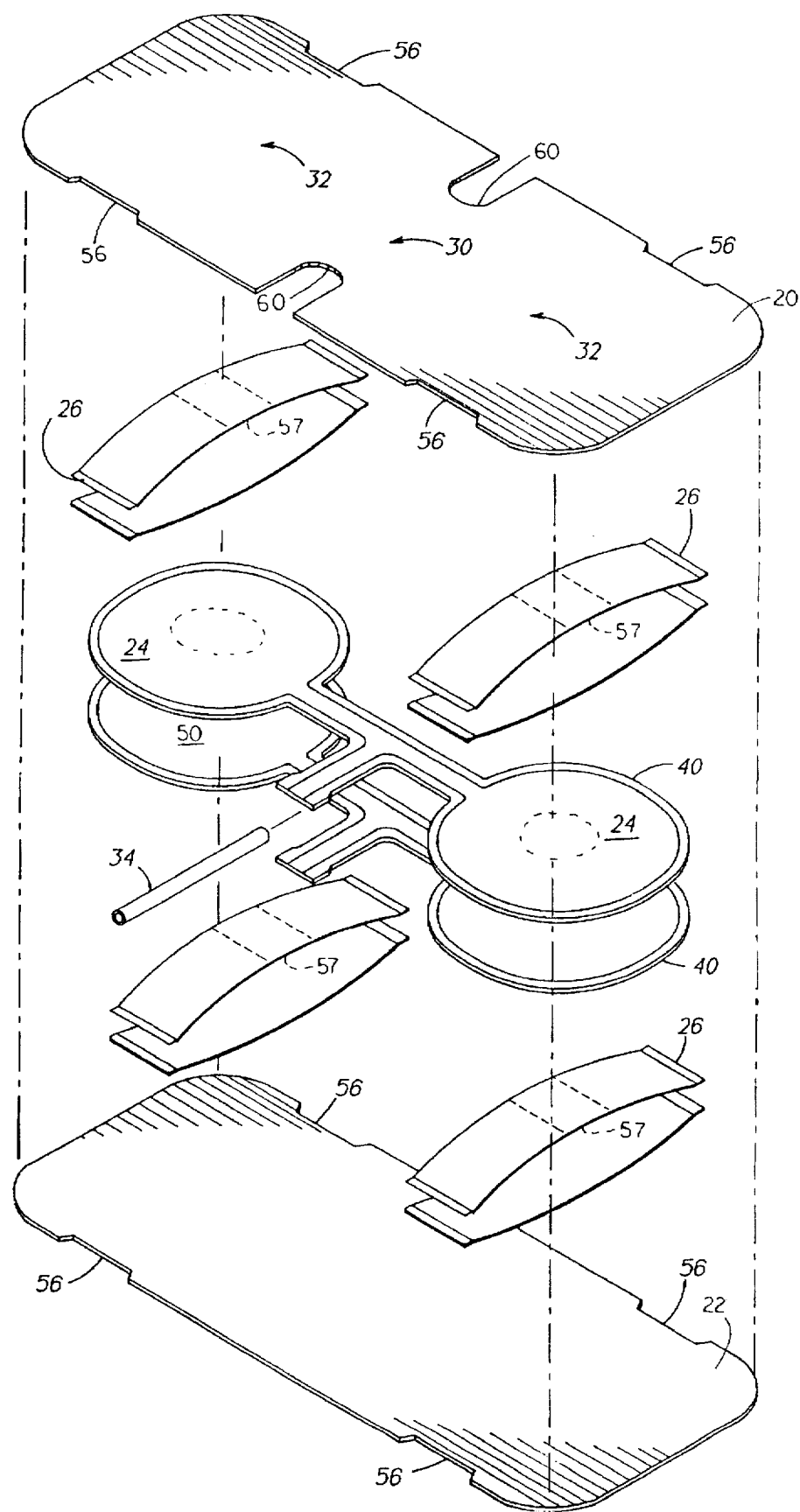
FIG. 4 is an exploded perspective view, illustrative of the method of manufacture of the lumbar support system of FIG. 1.

An inflatable lumbar support system 10 of the type embodying this invention of FIG. 1 is adapted to provide adjustable support for the lumbar region of an individual's back while in a sitting position. The support system may be a stand alone unit or may be integrated into the back of a seat, such as an office chair, recliner, or motor vehicle seat.

The lumbar support 10, shown in FIGS. 1–6, includes two laterally spaced inflatable bladders 14 interconnected by a fluid distribution conduit 16 disposed therebetween and an inflation conduit 18 connected to the fluid distribution conduit. The bladders 14 are laterally spaced so that they provide support to muscular area of the lumbar region and thereby reduce pressure to the spine.

A face panel 20 is secured to one side of the bladders 14 to provide an interface between the bladders and the user's back. The medial portion 30 of the face panel 20 has a greater degree of flexibility than the outer end portions 32 thereof to enable the face panel to flex at its medial portion to thereby relieve pressure to a user's spine and to the conform to the curvature of one's back. The form stable outer end portions 32 distribute the pressure exerted by the bladders 14 against the user's back. A generally rectangular rear panel 22 is secured to the other side of the bladders 14 to provide a form stable support for the bladders.

A pumping means (not shown) may be connected by a tube or hose 34 to the inflation conduit 18 to provide a means to adjustably inflate the bladders 14 to the desired pressure.

In the embodiment shown in FIG. 1, the bladders 14 is formed of two sheets 40 of heat-sealable thermoplastic material, such as polyurethane, polyvinyl chloride and the like. The sheets 40 are cut to the desired shape for ease of sealing and assembly of the part. The sheets 40 are selectively sealed by RF energy or heat to form the laterally spaced bladders 14, fluid distribution conduit 16, and inflation conduit 18. The bladders 14 are shown in FIG. 1 as generally circular, however, they may be of any suitable shape. The range of extension of the face panel 20 from the rear panel 22 is directly proportional to the diameter of the bladders 14.

In the embodiment shown in FIG. 1, the rear and face panels 20 and 22 are secured to the outer surfaces 24 of the bladders 14 by a plurality of straps 26. Each strap 26 is sealed tangential, at the point of inflation, to the center of the outer surfaces 24, as at 25, of the bladders 14 enabling the panels 20 and 22 to freely tilt forward and backward about the laterally axis x. As shown in FIG. 6, the straps 26 may be formed by sealing two rectangular sheets 44 of thermoplastic material superposed in edge-to-edge relation along their upper and lower edges 46 and 48. The sheets 44 are then vertically cut to form loops approximately ¾-inch wide.

Referring to FIG. 4, the inner surface 50 of a sheet 40 of the bladders 14 is coated with a barrier or release material about their center at 52. In addition, the inner surface 54 of the straps 26 are coated with the release material as at 57. The release material prevents the inner surfaces 50 of the bladders 14 and the inner surfaces 54 of the straps 26 from sealing together when the straps are sealed to the outer surfaces 24 of the bladders 14.

The release material may be applied, such as disclosed in my earlier U.S. Pat. No. 5,022,109, by conventional printing techniques, such as silk screening, rotogravure or flexographic process. Preferably, the coatings are applied as a composition in a liquid dispersion medium of an organic solvent or water base with a dispersed phase of finely divided microscopic particles of a polyethylene, a polytetrafluoroethylene (Teflon) or silicone on the order of five microns in diameter. With the release material firmly bonded to the sheets, the polyethylene, Teflon or silicone particles thereof will inhibit the sealing of the coated areas in the abutted portions of the two sheets engaged by the sealing dies.

Once the straps 26 are sealed to the bladders 14, the panels 20 and 22 are slid through the straps, as shown in FIG. 5, to engage a plurality of notches 56 cutout of the upper and lower edges 58 and 59 thereof. The notches 56 prevent the panels from sliding through the straps 26 after assembly to maintain them in fixed relation to the bladders 14.

The panels 20 and 22 are formed of a resiliently flexible material, such as polyethylene and the like. The panels may be generally rectangular-shaped as shown in FIGS. 4 and 5. Material from the medial portion 30 of the face panel 20 is removed to increase the degree of flexibility thereof. One method of increasing the flexibility of the medial portion 30 of the front panel 20 is to cutout a notch 60 at the upper and lower edges 58 and 59 thereof, as shown in FIG. 5. In an alternative embodiment, a hole may be cutout in the medial portion 30 to provide the desired degree of flexibility. Flexibility of the front panel 20 may also be achieved by perforations, slots or grooves. The degree of flexibility of the medial portion 30 is directly proportional to the amount of material removed therefrom.

A tube 34 may be inserted into the inflation conduit 18 and sealed therein to provide a means to inflate the bladders 14, as best shown in FIGS. 1, 4 and 5. The other end of the tube 34 may be connected to a valve or pumping means to supply fluid into the bladder. The tube 34 preferably extends into the inflation conduit 18 to the junction with the fluid distribution conduit 16. The tube 34 will prevent the inflation conduit 18 from folding or kinking which may reduce or block fluid flow to the bladders 14.

Figure 7:
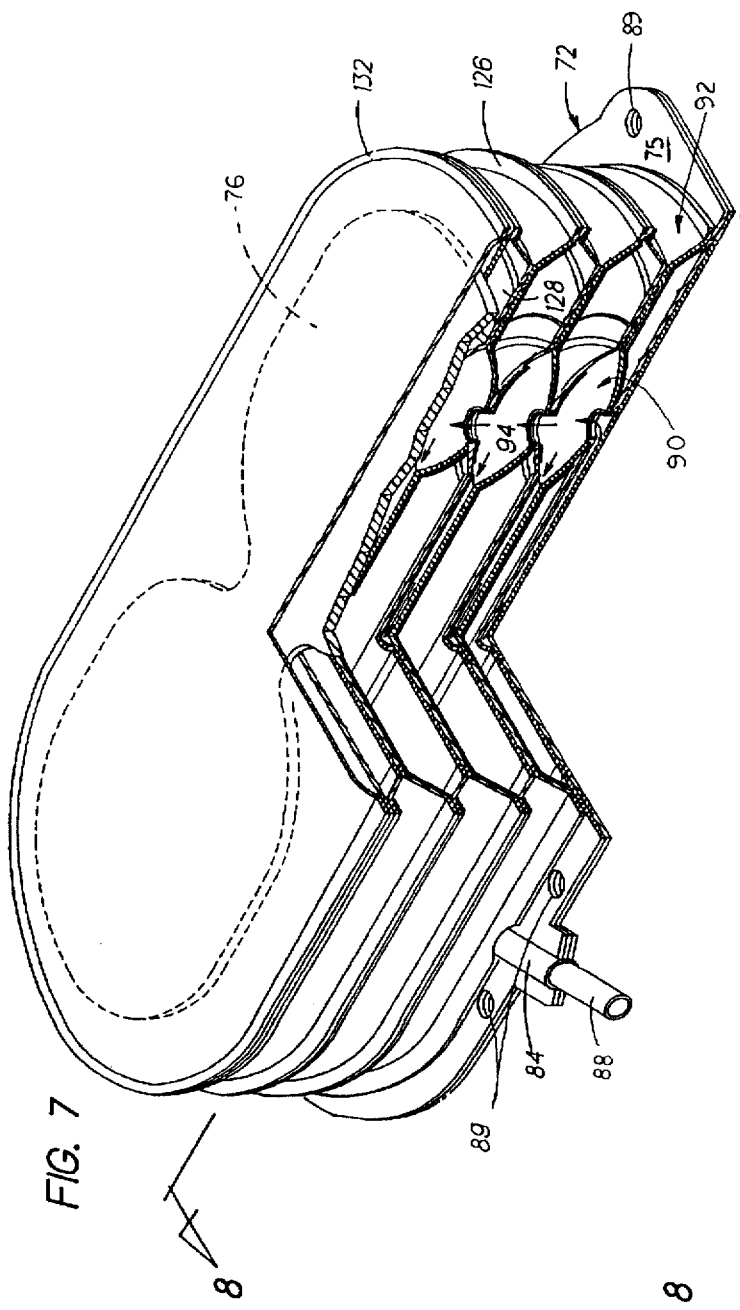
FIG. 7 is a perspective view having a portion thereof cut away of an alternative embodiment of the lumbar support system of FIG. 1.

FIG. 7 illustrates an alternative embodiment of a co-planar multi-laminar lumbar support embodying this invention formed of a plurality of heat-sealable thermoplastic sheet material. The support system 70 comprises a fluid flow control panel 72, which is disclosed in the above identified pending patent application, Ser. No. 08/449,898, that provides fluid flow to a bellows portion 74 which is selectively sealed at one end thereof to the upper surface 75 of the control panel, and a face panel 76 secured in fixed relation to the other end of the bellows portion.

The control panel 72 is formed of an upper and lower sheet 80 and 81 of thermoplastic material of generally oval shape selectively sealed together at 82 to define an inflation conduit 84 and fluid distribution conduit 86. The inner bellows 90 communicate with the conduits 84 and 86 through two orifices 87 disposed in the upper sheet 80 of the control panel 72. An inflation tube 88 which supplies air to the support system 70 is sealed within the inflation conduit 84. The tube 88 is preferably inserted the entire length of the inflation conduit 84 to the orifice 87 to help prevent the conduit 84 from pinching off or folding and thus restricting the air flow to the inner bellows 90, to be described hereinafter. A plurality of mounting holes 89 are spaced along the periphery of the control panel 72 to provide the means which to secure the lumbar support system 70 to a support frame or panel.

Figure 8:
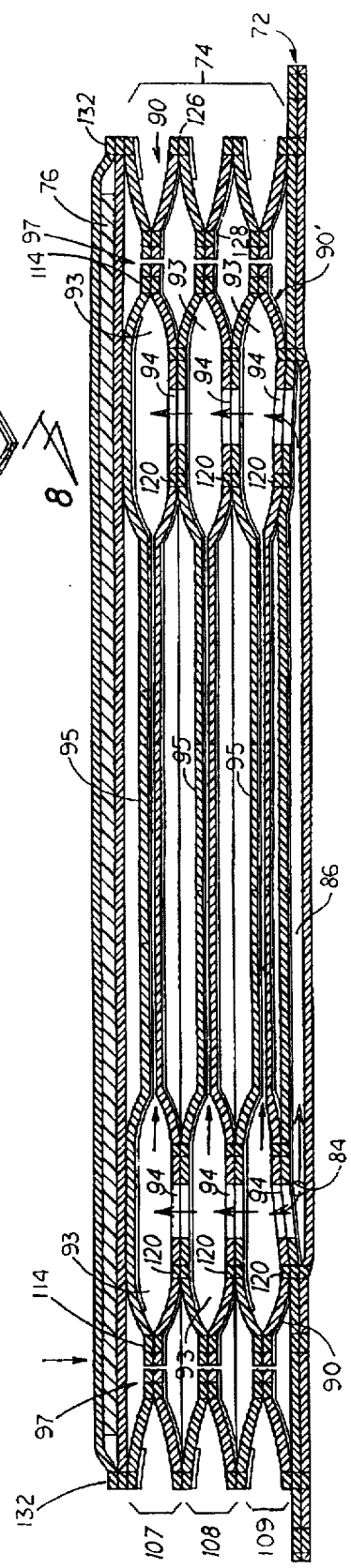
FIG. 8 is a cross-sectional view of the lumbar support system of FIG. 7.

In the embodiment shown in FIGS. 7 and 8, the bellows portion 74 comprises an outer bellows 92 and two laterally spaced inner bellows 90 disposed therein. Each inner bellows 90 includes a plurality of the generally circular chamber 93 vertically stacked with an orifice 94 disposed between each chamber to permit fluid flow therebetween.

The chambers 93 of the inner bellows 90 are interconnected by a plurality of fluid distribution conduits 95 to ensure fluid flow between the inner bellows should the distribution conduit 86 disposed in the control panel 72 become pinched or folded, thus blocking or reducing air flow between the inner bellows 90. In addition, the multiple conduits 95 improves responsiveness of fluid transfer between the inner bellows 90 should the user twist against the support system 70, whereby more pressure is applied to one of the inner bellows than the other.

The outer bellows 92 is adapted to provide additional support to restrict lateral and vertical movement of the face panel 76, maintain the face panel generally parallel to the control panel 72 and protect the inner bellows 90 from debris. A plurality of vertically aligned orifices 96 are disposed in the control panel 72 and layers of the bellows portion 74 to permit air to be drawn into and out of the bellows portion as the inner bellows 90 inflate and deflate, respectively. A relief cut 97 is disposed between the outer edge of each chamber 93 of each inner bellows 90 and the outer bellows 92. The relief cut 97 substantially extends about the chambers 93 to prevent the sides of the outer bellows 92 from pulling inwardly and deforming as the inner bellows 90 inflate thus, permitting the face panel 76 to extend parallel from the control panel 72.

The face panel 76, as best shown in FIGS. 9 and 10, is sealed between two superposed sheets 100 and 102 of thermoplastic material to enable the face panel 76 to be easily secured to the bellows portion 74 of the support system 70.

The lumbar support system 70, shown in FIG. 7, may be formed in three steps. The first step is to form the control panel 72 by superposing the upper and lower sheets 80 and 81 in stacked edge-to-edge relation and selectively sealing, as at 82, the sheets together to form the inflation conduit and the fluid conduit. An inner surface of the conduits 84 and 86 are coated with a release material 104 to prevent them from sealing together when the bellows portion 74 is sealed to the upper surface 106 of the control panel 72.

Referring to FIGS. 8–10, the next step is to simultaneously form and seal the bellows portion 74 to the outer surface 106 of the upper sheet 80 of the control panel 72. The bellows portion 74 of the embodiment, shown in FIGS. 8 and 9, includes three vertically stacked layers 107, 108 and 109 each of which are formed of an upper and lower sheet 110 and 112 of thermoplastic material respectively.

The inner bellows 90 are formed by sealing each layer 107–109, as at 114, (see FIGS. 8 and 10) to define a chamber 93 of each bellows 90 and the fluid distribution conduit 95 disposed therebetween. The release material is selectively coated at 116 on the lower surface 118 of the lower sheet 112 of each layer to prevent sealing between the upper sheet 110 of one layer to the lower sheet 112 of another layer. The layers 107–109 are sealed together at 120 (see FIGS. 8 and 10) about the orifices 94 disposed within the chambers 93 to form the inner bellows 90. The lower surface 122 of the upper sheet 110 of each layer 107–109 is coated at 124, as shown in FIG. 8, to prevent the inner surfaces of the chambers 93 from sealing together.

The outer bellows is formed by sealing at 126 and 128 the outer edge portion of the layers. The outer seal 126 along the periphery of the layers seals the upper sheet 110 of one layer 107–109 to the lower sheet 112 of another layer. The lower surface 122 of the upper sheet 110 of each layer is coated at 130 to prevent the outer edges of the upper sheet and lower sheet 112 of each layer from sealing together. The inner seal 128 seals the upper and lower sheets 110 and 112 of each layer between the relief cut 97 and seal 126. Release material is coated on the lower surface 118 of the lower sheet 112 of each layer, as at 116 to prevent the lower sheet 112 of a layer from sealing to the upper sheet 110 of another layer at seal 128 and the upper surface 106 of sheet 80 of the control panel 72.

The final step is to seal the face panel 76 between two sheets of thermoplastic material 100 along their periphery, as shown in FIGS. 9 and 10. The preformed assembly is then stacked in edge-to-edge relation on the top layer of the bellows portion 74 and sealed along its periphery 132 to secure the face panel 76 thereto.

FIG. 11 is an exploded view of a lumbar support 10 fashioned for mounting on a cantilevered back support 247 (see FIG. 17) of a chair. A back plate 175 is provided for each side of the air inflatable bladder or lumbar assembly 10. Each back plate 175 is formed as a ring having a half-oblong shaped portion 178 that is closed by a straight portion 179. Formed integral with each back plate 175, is a mounting arm or device 177 that terminates in a hook 180. The back plates 175 are made from resilient plastic material and the hooks 180 are shaped such that they must be deflected or opened when slid over the edge of the cantilevered back support 247, thus, creating a frictional engagement between the hooks and the surface of the back support 247. The resiliency of the hooks 180 are sufficient to hold the air inflatable bladder or lumbar assembly 10 in a vertical adjusted location on the cantilevered back support 247. The inner surfaces of the hooks can be covered with felt 183 or other soft material to prevent scratching of the surface of the back support 247 when the air inflatable bladder or lumbar assembly 10 is adjusted vertically relative to the back support 247. A plurality of openings 176 are formed along the half-oblong shaped portions 178 of the back plates 175. As shall be further discussed, the openings 176 are used to connect the back plates to the other components of the air inflatable bladder or lumbar assembly 10.

Also seen in FIG. 11 is a generally oblong shaped front clamp plate or ring 181 that extends around the entire periphery of the air inflatable bladder or lumbar assembly 10. The front clamp plate or ring 181 is made from resilient plastic material and has a plurality of pins 182 that protrude from its back surface. The pins 182 are aligned with the openings 176 formed in the back plates 175. The peripheral edge of the fluid flow control panel 72, is sandwiched between the back plates 175 and the front clamp plate or ring 181. The pins 182 pierce the peripheral edge of the fluid flow control panel 72 and are fused to thus secure the components of the air inflatable bladder or lumbar assembly 10 in assembled positions. The back plates 175 and clamp plate or ring 181, when fused together, function as the support plate 172 for the air inflatable bladder assembly 10. The components, the back plates 175 and the clamp plate or ring 181, of the support plate 172, are made from flat flexible material. When the air inflatable bladder or lumbar assembly 10 is attached to the back support 247 its support plate 172 must conform to the contour of the front face of the back support 247. The back support surface of the back support 247 has a shallow concave shape in horizontal cross-section that is designed to generally conform to the shape of a person's back. This shallow concave shape changes along the vertical expanse of the back support. Since the components 175 and 181 of the support plate 172 are ring-shaped and only the front clamp plate 181 spans the central portion of the support plate 172, the support plate has sufficient flexibility to conform to the changing concave contour of the front face of the back support 247 as it is vertically adjusted. The construction cost of the support plate from flat material is very economical as compared to the cost of a support plate constructed of material that is custom-formed to conform to the contour of the backrest. This is accomplished by this invention in such a way that the support plate 172 has sufficient flexibility to easily conform to the contour of the front face of the back support 247 throughout its vertical adjustment range. This is an important and significant contribution of this invention.

The outer bellows 92 is shown in its extended or inflated state in FIG. 11 and the inflation tube 88 which supplies air to the lumbar support 10 is shown. An extension tube 188 is shown that is connected to inflation tube 88 and extends to the pump device 197 (see FIG. 12).

The isolated lumbar support 10, in its contracted or deflated state, is shown assembled in FIG. 12. In FIG. 12 the extension tube 188 is shown connecting the inflation tube 88 to the pump device 197.

The pump device 197 is best seen in FIGS. 12 and FIG. 13 which is an exploded view of the pump device 197. The pump device 197 includes a tube 196 that as seen in FIG. 12 is connected to the extension tube 188. As shall be further discussed the pump device 197 is secured to one of the back webs 245 (FIG. 17). Although the pump 197 could be secured by an adhesive or other attachment devices in the preferred embodiment, double-backed adhesive tape 200 is used. The pump device 197 includes a pumping area 201 and an exhaust valve 202 and actuation button 203, both of which are accessible to a person setting in the chair 210. The pump device 197 can be constructed of thermoplastic sheet material that forms a pump chamber. The pump chamber is filled with open-cell elastomeric foam material. When the pumping area 201 is depressed, an air intake valve is closed and the air is forced through a check valve into the inflatable bladder or lumbar assembly 10. When the pressure on the pump is released, the intake valve is opened, the check valve closes and the pump chamber is filled with air. If it is desired to deflate the inflatable bladder or lumbar assembly 10, the exhaust valve button 203 is depressed and the air from the lumbar assembly 10 is exhausted through the pump. A pump such as this is more fully disclosed in U.S. Pat. No. 5,372,487, which patent in hereby, by reference, included as a part of this disclosure.

Figure 14:
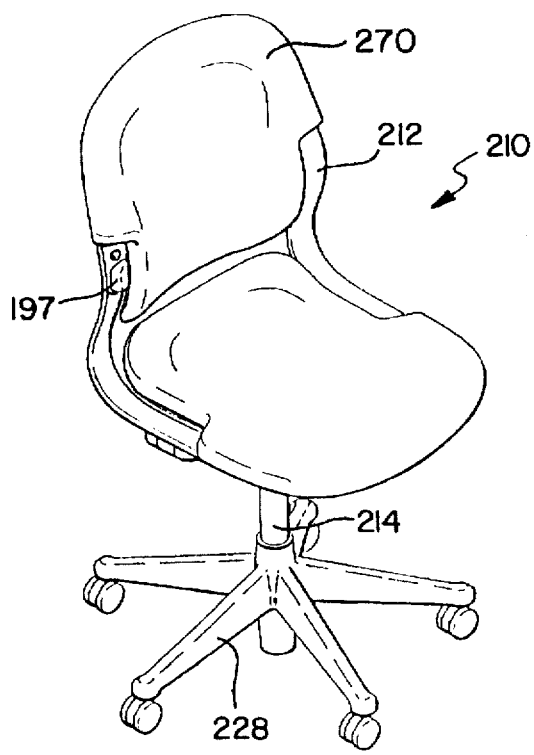
FIG. 14 is a front perspective view of a one-piece shell chair that has an upholstered cushion over the inflatable lumbar assembly.

There is shown in FIG. 14, an office chair or seat 210 of the type having one piece shell 212. The one piece shell 212 is mounted on a base 214 and can include a tilt mechanism and adjustable height mechanism (not shown). The tilt mechanism can be of the type that includes a torsion bar having a torsion adjusting handle that can be used to adjust the tilt. The base 214 is carried by a five-star roller base 228 that rest on the floor. The chair or seat 210 can also include chair arms that can be adjusted along with the tilt mechanism. An upholstered cushion 270 is secured to the one back portion of the piece shell 212.

The upholstered cushion 270 is shown, in FIG. 17, disconnected from the piece shell 212. The one piece shell 212 includes a backrest 240 that has a front face 241 and a seat pan 250.

The backrest 240 has vertically extending leg slots 243 and 244 formed therein defining back webs 245 outwardly of each slot. The inner edges of slots 243, 244 provide substantially vertical side edge portions along which the hooks 180 of the lumbar support 10 slide. Stops 248 are provide at the bottom edges of the vertical side edge portions to limit the downward movement of the hooks 180. The outer edges of the back webs 245 define the outermost side edges of the backrest 240. The backrest 240 includes a mid-back portion 246 from which the cantilevered back support 247 depends.

As best seen in FIG. 16, the seat pan 250 has leg slots 251 and 252 formed therein which defines seat webs 253 outwardly thereof. The seat pan 250 has a mid-thigh portion 254 at its forward end from which a cantilevered seat support 255 extends.

Also as seen in FIG. 16, the leg slots 243, 244 of the backrest 240 and the leg slots 251 and 252 of the seat pan 250 define an H-shaped opening 260 in the one piece shell 212. The H-shaped opening 260 includes a horizontal cross-slot 262. The seat or chair 210, including a one-piece shell 212, is of the type that is described more fully in the above-identified U.S. Pat. No. 4,529,247.

The air inflatable bladder or lumbar assembly 10 is shown fastened to the cantilevered back support 247, in FIGS. 16 and 17. As seen in these figures, the air inflatable bladder or lumbar assembly 10 includes hooks 180 that function to fasten it in vertically adjusted locations along the vertical edges of the cantilevered back support 247. The hooks 180 are located such that a person sitting in the chair 210 can reach back with both hands, grasp the mounting hooks 180 and adjust their location vertically along the edges of the cantilevered back support 247.

The upholstered cushion 270 includes an inner shell 271. The back surface of inner shell 271, as seen in FIG. 18, has a contour that conforms generally to the contour of the front surface of cantilevered back support 247. The inner shell 271 has a rectangular shaped opening 272 formed therein. A pair of keyhole slots 273 are formed along the upper edge of the inner shell and a pair of round openings 274 along the lower portion of the inner shell 271 for the purpose of releasably connecting the inner shell to the cantilevered back support 247. A foam cushion (not shown) is molded or foamed in-place on the front surface of the inner shell 271. Prior to foaming the cushion, the rectangular shaped opening 272 is covered with a sheet of shielding material 276. The shielding material 276 must be formed of a materials that, during the foaming in-place process, used for producing the foam cushion, foam material will not penetrate or seep through material 276 to its surface 277 (seen in FIG. 18). The lumbar support 10 is in contact with surface 277 and it is important that the surface 277, has a low coefficient of friction to facilitate the vertical adjustment of the lumbar assembly 10 relative thereto. The front surface of the air inflatable bladder or lumbar assembly 10 must be able to freely slide up and down the surface 277 of the material 276 that is exposed in the rectangular shaped opening 272.

After the foam cushion has been foamed on the front surface of inner shell 271, it is covered by upholstery fabric to complete the fabrication of the upholstered cushion 270.

The cantilevered back support has fastening devices 278 on its front surface for cooperation with the keyhole slots 273 and round openings 274 formed in the inner shell 271. The upholstered cushion 270 is connected to the backrest 240 by inserting the fastening devices 278 in the keyhole slots 273. When the upholstered cushion 270 is pulled down such that the fastening devices 278 are located at the tops of the small portion of the keyhole slots 273, the other fastening devices 278 thereby become aligned with the round openings 274. The bottom of the upholstered cushion 270 can then be pushed toward the one piece shell 212 which causes the other fastening devices 278 to enter the round openings 274 and secure the upholstered cushion 270 in place. It can, of course, be removed by pulling out on the bottom edges and then lifting up to release the fastening devices 278 from the keyhole slots 273. The upholstered cushion 270 is not connected to the cantilevered back support 247 along its vertical edges. Thus, the mounting arms 177 of the air inflatable bladder or lumbar assembly 10 can protrude from below the upholstered cushion 270 along the vertical edges of the cantilevered back support and slide therealong. A person sitting in the seat 210 can reach back, grasp the hooks 180, slide them relative to the cantilevered back support 247 to thereby vertically adjust the air inflatable bladder or lumbar assembly 10 relative to the cantilevered back support 247. The occupant of the chair 210 can also, while seated in the chair, inflate or deflate the air inflatable bladder or lumbar assembly 10, by use of the pump device 197, to thus change the contour of the upholstered cushion 270 and relieve discomfort and provide a variety of support positions.

Figure 15:
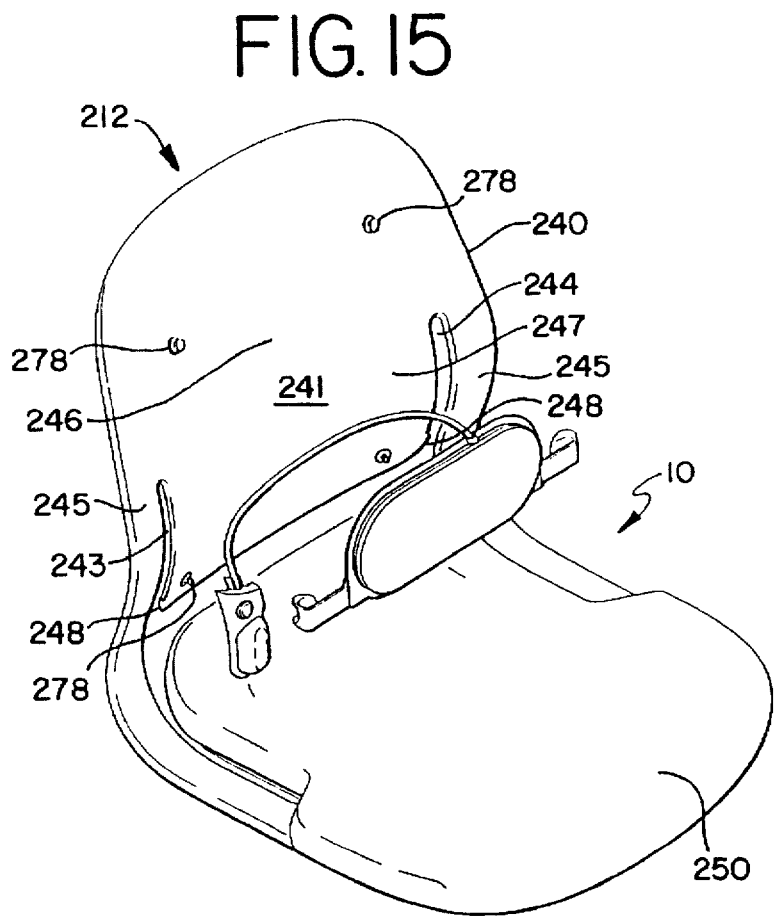
FIG. 15 is an exploded front perspective view of a one-piece shell and the inflatable lumbar assembly.

A preferred embodiment of the lumbar support 10 is shown in FIGS. 11–13 and 15–17. In FIGS. 15–17, the air inflatable bladder of lumbar support 10 is not inflated. When the air bladder is in this un-inflated condition, it is very thin and is contained in the rectangular opening 272 formed in the inner shell 271. As a result when the lumbar support 10 is not inflated it does not distort or extend the contour of cushion 270. As shown in FIG. 11, the air inflatable bladder of lumbar support 10 is inflated and as a result, would cause the upholstered cushion 270 to be extended.

While the invention has heretofore been described in detail with particular reference to this illustrated apparatus, it is to be understood that variations, modifications and the use of equivalent mechanisms can be effected without departing from the scope of this invention. It is, therefore, intended that such changes and modifications be covered by the following claims.

Having thus described our invention, what is claims is:

1. An office chair having an adjustable support, comprising:
    a seat;
    a back shell having a front face and substantially vertical side edge portions;
    an air inflatable bladder assembly positioned on said front face, said bladder assembly including an inflatable bladder and a pair of mounting devices extending laterally outward therefrom for attachment to the side edge portions of said shell;
    an actuator assembly for selectively admitting and venting air under pressure to and from said bladder, said actuator assembly including a hose in fluid flow communication with a pump device and the bladder, said pump device being accessible to an occupant of the chair;
    a cushion covering said back shell and bladder assembly, said cushion adapted to deform in response to actuation of the bladder to provide an adjustable support for the region of the back of a user sitting in the chair; and
    said cushion includes an inner shell that conforms generally to said back shell, said inner shell having an outer surface and an inner surface, said inner shell being formed from a rigid material and having a bladder assembly receiving opening formed therein, a cushion having front and back surfaces, said back surface of said cushion secured to the outer surface of said inner shell and interconnecting mechanisms on said back shell and said inner shell for mounting said inner shell on said front face of said back shell.

2. The office chair, as set forth in claim 1, wherein the pump device is located in the region of one of said side edge portions of the back shell.

3. The office chair, as set forth in claim 2, wherein said hose extends upwardly from the upper edge of said air inflatable bladder assembly across said back shell and then down to a position adjacent a vertical side edge portion of said front face.

4. The office chair, as set forth in claim 1, wherein said back surface of said cushion, in the area of said bladder assembly receiving opening, is covered with material that will not allow the foam cushion to penetrate or seep through such that a low friction surface for engagement with said bladder assembly is provided.

5. The office chair, as set forth in claim 1, wherein said mounting devices are adapted to slidably secure the bladder assembly to the side edge portions of the back shell to allow vertical adjustment of the bladder assembly.

6. The office chair, as set forth in claim 5, wherein the mounting members each comprises a hook member wrapped around a corresponding edge portion of the back shell, said hook members adapted to slidable engage said edge portions.

7. The office chair, as set forth in claim 6, wherein the back shell has a pair of vertical slots formed therein, said slots being spaced inwardly from outermost side edges of said back shell, said side edge portions of the back shell being defined by inner edges of said slots and wherein the hook members slidably receive said inner edges of said slots.

8. The office chair, as set forth in claim 1, wherein the back shell is concave in horizontal cross-section and the bladder assembly further comprises a support plate for supporting the bladder, said support plate being formed from flat material having sufficient flexibility to conform to the contour of said back shell.

9. The office chair, as set forth in claim 8, wherein said support plate includes ring-shaped back plates that reduces the force necessary to conform the support plate to the contour of said back shell.

10. The office chair, as set forth in claim 8, wherein said support plate comprises ring-shaped plates to be secured together that reduce the force necessary to conform the support plate to the contour of said back shell.

11. The office chair, as set forth in claim 10, wherein the pump device is mounted to the back shell between one of the slots and the corresponding outermost side edge of the back shell.

12. The office chair, as set forth in claim 10, wherein said inner edges of said slots include stops to limit the downward movement of said hook members.

13. The office chair, as set forth in claim 1, wherein the bladder assembly comprises a pair of inflatable bladder sections horizontally spaced from one another to allow a relief region between the bladder sections which relieves pressure against the spine of a user sitting in the chair, said bladders being in fluid flow communication to allow substantially simultaneous inflation and venting of said bladders.

14. The office chair, as set forth in claim 13, wherein each bladder comprises a dual-chamber membrane extendible in a direction generally normal to the back shell and toward the back of a user sitting in the chair.

15. The office chair, as set forth in claim 1, wherein the bladder assembly comprises a dual-chamber membrane extendible in a direction generally normal to the back shell and toward the back of a user sitting in the chair.

16. An office chair having an adjustable support, comprising:
    a seat;
    a back shell having a front face and substantially vertical side edge portions;
    an air inflatable bladder assembly positioned on said front face, said bladder assembly including an inflatable bladder and a pair of mounting devices extending laterally outward therefrom for attachment to the side edge portions of the shell, said mounting members adapted to be releasably secured at different heights along the side edge portions of the back shell to allow vertical adjustment of the bladder assembly;
    an actuator assembly for selectively admitting and venting air under pressure to said bladder assembly, said actuator assembly including a hose in fluid flow communication with a pump device and the bladder assembly, said pump device being positioned on the front face of the back shell in the region of one of said side edge portions and a portion of said hose being positioned on the front face of the back shell above the upper edge of said bladder assembly;

a cushion covering the back shell and bladder assembly, said cushion adapted to deform in response to actuation of the bladder assembly to provide an adjustable support for the region of the back of a user sitting in the chair; and said cushion includes an inner shell that conforms generally to said back shell, said inner shell having an outer surface and an inner surface, said inner shell being formed from a rigid material and having a bladder assembly receiving opening formed therein, a cushion having front and back surfaces, said back surface of said cushion secured to the outer surface of said inner shell and interconnecting mechanisms on said back shell and said inner shell for mounting said inner shell on said front face of said back shell.

17. The office chair, as set forth in claim 16, wherein said mounting devices each comprises a hook member wrapped around a corresponding edge portion of the back shell, said hock members adapted to slidable engage said edge portions.

18. The office chair, as set forth in claim 17, wherein the back shell has a pair of vertical slots formed therein, said slots being spaced inwardly from the outermost side edges of said back shell to form a cantilevered portion of the backrest, said side edge portions of the back shell being defined by the inner edges of said slots and wherein the hook members slidably receive said inner edges of said slots.

19. The office chair, as set forth in claim 18, wherein said inner edges of said slots include stops to limit the downward movement of said hook members.

20. The office chair, as set forth in claim 18, wherein the pump device is mounted to the back shell between one of the slots and the corresponding outermost side edge of the back shell.

21. The office chair, as set forth in claim 16, wherein the back surface of said cushion, that overlays said bladder assembly receiving opening, is covered with material that will provide a low friction surface for engagement with said bladder assembly.

22. The office chair, as set forth in claim 16, wherein the back shell is concave in horizontal cross-section and the bladder assembly further comprises a support plate for supporting the bladder, said support plate being formed from flat material having sufficient flexibility to conform to the contour of said back shell.

23. The office chair, as set forth in claim 22, wherein said support plate includes ring-shaped back plates that reduces the force necessary to conform the support plate to the contour of said back shell.

24. The office chair, as set forth in claim 22, wherein said support plate comprises ring-shaped plates to be secured together that reduce the force necessary to conform the support plate to the contour of said back shell.

25. The office chair, as set forth in claim 16, wherein the bladder assembly comprises a pair of inflatable bladders horizontally spaced from one another to allow a relief region between the bladders which relieves pressure against the spine of a user sitting on the chair, said bladders being in fluid flow communication to allow substantially simultaneous inflation and venting of said bladders.

26. The office chair, as set forth in claim 25, wherein each bladder comprises a dual-chamber membrane extendible in a direction generally normal to the back shell and toward the back of a user sitting in the chair.

27. The office chair, as set forth in claim 16, wherein the bladder comprises a dual-chamber membrane extendible in a direction generally normal to the back shell and toward the back of a user sitting in the chair.

28. An office chair having an adjustable support, comprising:

a seat;

a back shell having a front face and substantially vertical side edge portions;

an air inflatable bladder assembly positioned on said front face, said bladder assembly including a support plate, a pair of horizontally spaced inflatable bladders attached to said support plate and a pair of mounting devices extending laterally outward from said support plate for attachment to the side edge portions of the shell, said mounting members adapted to releasably secure the support plate to the side edge portions of the back shell to allow vertical adjustment of the bladder assembly;

an actuator assembly for selectively admitting and venting air under pressure to said bladders, said actuator assembly including a hose in fluid flow communication with a pump device and one of said bladders, said pump device being accessible to an occupant of the chair and a portion of said hose being positioned on the front face of the back shell adjacent said air inflatable bladder assembly; and a cushion covering the back shell and bladder assembly, said cushion adapted to deform in response to actuation of the bladder to provide an adjustable support for the region of the back of a user sitting in the chair.

29. The office chair, as set forth in claim 28, wherein the mounting members each comprises a hook member wrapped around a corresponding edge portion of the back shell, said hook members adapted to slidably engage said edge portions.

30. The office chair, as set forth in claim 29, wherein the back shell has a pair of vertical slots formed therein, said slots being spaced inwardly from the outermost side edges of said back shell, said side edge portions of the back shell being defined by inner edges of said slots and wherein the hook members slidably receive said inner edges of said slots.

31. The office chair, as set forth in claim 30, wherein said inner edges of said slots include stops to limit the downward movement of said hook members.

32. The office chair, as set forth in claim 30, wherein the pump device is mounted to the back shell between one of the slots and the corresponding outermost side edge of the back shell.

33. The office chair, as set forth in claim 28, wherein said cushion includes an inner shell that conforms generally to said back shell, said inner shell having an outer surface and an inner surface, said inner shell being formed from a rigid material and having a bladder assembly receiving opening formed therein, a cushion having front and back surfaces, said back surface of said cushion secured to the outer surface of said inner shell and interconnecting mechanisms on said back shell and said inner shell for mounting said inner shell on said front face of said back shell.

34. The office chair, as set forth in claim 33, wherein the back surface of said cushion, in the area of said bladder receiving opening, is covered with material that will provide a low friction surface for engagement with said bladder assembly.

35. The office chair, as set forth in claim 28, wherein the back shell is concave in horizontal cross-section and wherein said support plate is formed from flat material having sufficient flexibility to conform to the contour of said back shell.

36. The office chair, as set forth in claim 35, wherein said support plate includes ring-shaped back plate that reduces the force necessary to conform the support plate to the contour of said back shell.

37. The office chair, as set forth in claim 35, wherein said support plate comprises ring-shaped plates to be secured together that reduce the force necessary to conform the support plate to the contour of said back shell.

38. The office chair, as set forth in claim 28, wherein each bladder comprises a dual-chamber membrane extendible in a direction generally normal to the back shell and toward the back of a user sitting in the chair.

39. An office chair having an adjustable support, comprising:

a seat;

a back shell having a front face and substantially vertical side edge portions;

an air inflatable bladder assembly, including a dual-chamber membrane, positioned on said front face, said bladder assembly including a support plate;

an actuator assembly for selectively admitting and venting air under pressure to said bladder, said actuator assembly including a pump device and a hose in fluid flow communication with said pump device and said bladder;

a cushion covering the back shell and bladder assembly, said cushion adapted to deform in response to actuation of the bladder to provide an adjustable support for the region of the back of a user sitting in the chair;

said dual-chamber membrane including a plurality of layers of sheets stacked one on top of the other;

engaging sheets of adjacent layers being bonded together along their peripheral edges forming a plurality of first chambers therebetween, said first chambers being vented to the atmosphere;

each of said layers comprising an upper and a lower sheet of material that are bonded together in a closed pattern within said peripheral edges to form second chambers therebetween;

the lower sheet of the first layer of sheets being connected along its peripheral edge to said support plate;

said upper and lower sheets of said layers having relief cuts formed therethrough between said bonded closed pattern and said peripheral edges, engaging sheets of adjacent layers being bonded together at a location within said bonded closed pattern and an opening through said engaging sheets formed within this bonding to provide communication between adjacent second chambers; and said hose connected to said series of second chambers such that when said series of second chambers is pressurized by said pump, said dual-chamber membrane will extent in the direction generally normal to said support plate and said first chambers will function to protect, guide and support said second chambers.

40. The office chair, as set forth in claim 39, wherein said second chambers are formed in two segments that are horizontally spaced from one another to allow a relief area therebetween which functions to relieve pressure on the spinal area of the occupant of the chair.

41. The office chair, as set forth in claim 40, wherein a distribution plate is provided within said dual-chamber membrane at the outer surface of the last layer of sheets that functions to distribute the pressure of the said two segments of said second chamber over an area of the back of the occupant of the chair and acts as a protective shield for said second chambers.

42. The office chair, as set forth in claim 39, wherein a distribution plate is provided within said dual-chamber membrane at the outer surface of the last layer of sheets that functions to distribute the pressure of the expanded second chambers over an area of the back of the occupant of the chair and acts as a protective shield for said second chambers.

* * * * *